Dec. 1, 1964  M. M. CREME  3,158,952
PRECOILED ARTIFICIAL LURE
Filed Oct. 21, 1963

INVENTOR.
MICHAEL CREME
BY
ATTORNEY 3,158,952
PRECOILED ARTIFICIAL LURE
Michael M. Creme, 1219 Big Falls Drive, Akron, Ohio
Filed Oct. 21, 1963, Ser. No. 317,651
2 Claims. (Cl. 43—42.24)

This invention relates to the art of artificial lures. More specifically, it has reference to an artificial lure that is molded in coiled configuration so as to enhance its worm simulating characteristics during use by a fisherman.

In recent years, through the use of plastic or similar materials, manufacturers have been able to practically duplicate the appearance of animals, and particularly the smaller animals. Accordingly, the artificial lure industry has introduced lures simulating bait, as for example, small minnow-type fish and a variety of low-grade segmented animal life including the worm. These simulated productions not only look, but even feel, like the real life prototype, and their use as bait has proven highly successful. Despite success, efforts to improve artificial lures are constant and continuing. There is recognition of the fact that life is not simulated merely by duplication of appearance, since most living things are possessed of their own peculiar form of action and movement.

Recognition of this factor formed a basis for a patent application, now U.S. Patent 3,100,360, issued in the name of the applicant. Game fish respond to movement, and an effort was made to add this ingredient to artificially produced lures. The identified patent, therefore, demonstrates an effort to depart from accepted elongated straight line configurations with a view toward imparting characteristic movement to characteristic appearance. For instance, an artificial lure, such as a worm, when manufactured in a coiled configuration, will partially extend itself, swivel and otherwise imitate the action of its prototype when pulled through water under the commands of a fisherman.

Devices of this nature have proved successful in fulfilling the purpose for which they were manufactured. It has been found, however, that the action and the movement of such simulated lures may be improved upon by integrated mechanical structures which in no way detract from the simulated appearance of the lures. Greater flexibility and quickened spring-like action become additional movement characteristics of lures already enlivened by coiling, with improved noise-making characteristics also resulting.

Production of an improved lure having the above described characteristics is the principal object of this invention, with other objects thereof becoming more apparent upon a reading of the following brief specification, considered and interpreted in the light of the accompanying drawings.

Figure 1:
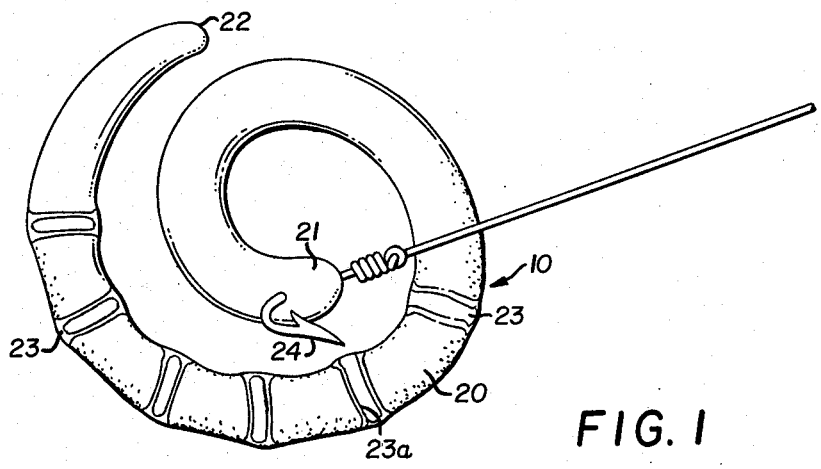
FIGURE 1 is a plan view showing the improved bait in its normal coiled position.

Referring now to the drawings and particularly to FIGURE 1, the improved lure, generally designated by the numeral 10, includes an elongate body portion 20 that preferably has a head section 21 and a tail section 22. The body 20 is molded in coiled configuration so that the head section 21 constitutes the innermost portion of the coiled lure body, while the tail section 22 constitutes the outermost portion of the coiled lure body. The body 20 preferably progressively tapers from its maximum diameter in the region of the head section 21 to its minimum diameter in the region of tail section 22.

Longitudinally spaced on body 20 are transverse slots or cut-outs 23, 23. The slots 23, which can be made in such a manner as to duplicate natural markings, provide zones of resistance as well as weakened areas which greatly enhance the flexibility of the simulated lure. The walls 23a resulting from the formation of the slots 23 offer resistance to pull and direction changes transmitted through the fishing line, as will hereinafter become apparent.

With regard to the depth of the slots, it is to be understood that the depth is a matter of choice so long as the depth extends throughout an appreciable amount of the overall thickness so as to weaken the lure, with it being noted, however, that the deeper the slot, the weaker the lure itself will become and, accordingly, if it is desired to utilize slots which are of such a depth that a relatively thin portion remains at the bottom of the lure, it may be necessary to reinforce the bottom so as to retain the normal strength of the lure.

Figure 3:
FIGURE 3 is a sectional view taken on the lines 3—3 of FIGURE 2 and highlighting the mechanical feature of this invention.
Figure 2:
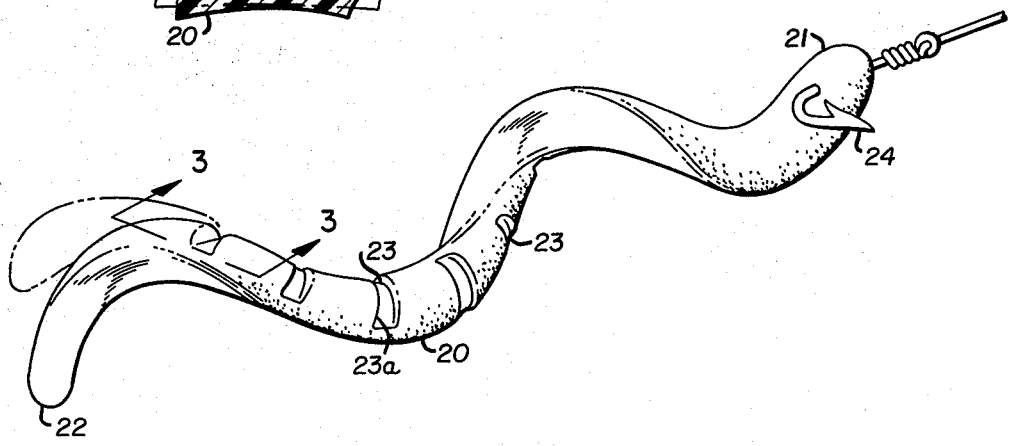
FIGURE 2 is a view showing the position of the lure of FIGURE 1 during movement through the water.

A hook 24 is passed through head 21 and attached to a line in known fashion, thereby permitting the lure 10 to be drawn through the water according to the dictates of a fisherman handling the line. The coiled construction, as already known, causes the lure to gyrate in a somewhat spiral path, with the lure, at the same time, being elongated so as to be rotatable around an axis which is generally co-extensive with the axis of a connecting rod to which the line is attached. The spiral path obviously will become progressively larger as it proceeds toward the tail section 22 of reduced diameter. The transverse slots, through walls 23a, will be resisting drawing of the lure 10 through the water. Not only is there a tendency for the lure 10 to slip and slide sideways but the resulting build-up of pressure reacts upon the weakened areas to further enhance the life simulating movements of the lure. Quickness of action becomes a characteristic in the movement of the lure. These quick movements, such as jerking and snapping as shown in the chain-dotted lines of FIGURE 3, are most attractive to the prey hunters and especially game fish.

It should be noted that in addition to the aforementioned jerking and snapping motion imparted to the lure by the transverse slots 23, 23, said slots will also serve to cause the lure to create noise while being drawn through the water, with it being understood that the noise so produced will likewise serve to attract fish to the lure.

In use and operation, it will first be necessary for the lure 10 to be attached to the line through hook 24, with the artificial bait being then inserted into the water in normal manner. Since the lure 10 is coiled, gyrations of a spiraling nature will occur when the lure tends to elongate. The tendency to elongate will also cause rotation around an axis generally co-extensive to the connecting rod. Further movement will be provided by the slots 23. Pull and directional changes will be resisted, resulting in slipping and sliding as well as a build-up of pressure reacting on the weakened areas causing snapping and jerking to occur in the lure.

While this description has been purposely concentrated toward one fishing method, it is to be understood that the artificial lure described may be used with equal effectiveness as an auxiliary member with other artificial bait or employed by those who prefer still fishing.

There has been shown, then, an artificial lure having enhanced characteristic movement as well as characteristic appearance. Slipping, sliding, jerking and snapping, the physical movements which require a quickness of action, join with swiveling and rotation to produce increased life-like activity in a lure having a life-like appearance.

While a full and complete description of the invention has been set forth in accordance with the dictates of the Patent Statutes, it is to be understood that the invention is not intended to be so limited. Accordingly, modifications of the invention may be resorted to without departing from the spirit hereof or the scope of the appended claims.

What is claimed is:

1. An artificial lure of the character described, comprising:
    (A) a solid, flexible, elongate body of rubbery material
        (1) having a modicum of rigidity and normally assuming the position of a segmented crawling animal that is positioned in coiled position on a flat surface,
        (2) having an innermost coiled end and an outermost coiled end that overlaps said innermost end to define a complete coil,
        (3) one said coiled end portion being adapted to be secured to a fishing line,
        (4) said lure rotating, in spiral-like fashion, around an axis that is generally coextensive with the axis of the connecting end of said fishing line during movement of said lure and said line through the water, and with the coiled configuration of said lure being extended along said axis during movement of said lure and said line through the water,
        (5) said body having at least one pair of spaced transverse wall portions extending inwardly from the outer surface thereof; said wall portions defining a slot of material depth relative to the thickness of the lure body and providing a resistance zone and weakened area that are responsive to pressures exerted on said walls during normal movement of said lure through the water to impart additional movement to said lure;
        (6) said body being slotted on one side only with the opposing side thereof being relatively smooth to permit ready jerking or snapping.

2. The device of claim 1 further characterized by the fact that said body includes a plurality of said slots extending transversely of said body and being longitudinally spaced on one surface of said body, whereby quickening movement is imparted to said lure during use thereof.

References Cited by the Examiner
UNITED STATES PATENTS 2,793,460  5/57  Mutchler _____ 43—42.47 X
2,979,850  4/61  Lund _____ 43—42.24
3,068,604  12/62 Nyberg _____ 43—42.24 XR
3,100,360  8/63  Creme _____ 43—42.24 XR ABRAHAM G. STONE, *Primary Examiner.*